United States Patent
Kuo et al.

(10) Patent No.: US 7,264,365 B2
(45) Date of Patent: Sep. 4, 2007

(54) LAMP POSITIONING STRUCTURE

(75) Inventors: Yi-Chen Kuo, Tao Yuan Shien (TW); Wei-Chih Chiu, Tao Yuan Shien (TW); Hsin-Chih Chen, Tao Yuan Shien (TW); Shr-Bin Lin, Tao Yuan Shien (TW); Yu-Chen Hsu, Tao Yuan Shien (TW); Kuang-Yu Fan, Tao Yuan Shien (TW)

(73) Assignee: Quanta Display Inc., Tao Yuan Shien (TW)

( * ) Notice: Subject to any disclaimer, the term of this patent is extended or adjusted under 35 U.S.C. 154(b) by 67 days.

(21) Appl. No.: 11/335,665

(22) Filed: Jan. 20, 2006

(65) Prior Publication Data

US 2006/0171169 A1    Aug. 3, 2006

(30) Foreign Application Priority Data

Jan. 20, 2005    (TW) ................. 094101672

(51) Int. Cl.
*G01D 11/28*    (2006.01)
(52) U.S. Cl. .................. 362/29; 362/216; 362/225
(58) Field of Classification Search .............. 362/29, 362/30, 97, 216, 223, 225, 260, 561, 614; 349/60, 70
See application file for complete search history.

(56) References Cited

U.S. PATENT DOCUMENTS

| 6,916,102 B2 * | 7/2005 | Lin ............................. 362/29 |
| 7,057,678 B2 * | 6/2006 | Ishida et al. .................. 349/70 |
| 7,086,753 B2 * | 8/2006 | Lin et al. ..................... 362/225 |

* cited by examiner

*Primary Examiner*—Y. My Quach-Lee
(74) *Attorney, Agent, or Firm*—Bacon & Thomas, PLLC

(57) ABSTRACT

A lamp positioning structure is disclosed. The lamp positioning structure is assembled on a display device and includes a fastening element mounted on a side plate of a rear plate. The lamp is curve-line-shaped and is mounted over the rear plate. Moreover, the lamp includes at least a curved section. Also, a display panel having a display area is assembled over the rear plate to cover the lamp. The curved section of the lamp is arranged in the display area without damaging the brightness uniformity nearby. In addition, two elastic arms are disposed on both lateral sides of the fastening element to abut against the curved section. Through the arrangement of the positioning structure, the breakage and the displacement of the lamp can be reduced or even prevented. The brightness of the curved section corresponding to the fastening element becomes more uniform and without definite dark spots.

7 Claims, 4 Drawing Sheets

LAMP POSITIONING STRUCTURE

BACKGROUND OF THE INVENTION

1. Field of the Invention

The present invention relates to a lamp positioning structure; in particular, a lamp positioning structure for a backlight module of a display device.

2. Description of Related Art

Many lamps are assembled in the modern backlight module of a flat panel display device. These lamps are the main light source for illuminating the display device. For a modem bottom light backlight module, the shape of the lamp is shifted from the straight-line shape to the curve-line shape (for example, the U-shape or the C-shape). However, the brightness of the bend part of the curved-shape lamp is relatively high. The unusual high brightness always causes high local brightness of a specific spot or an area on the display. Hence, effective reduction or elimination of these unusual spots with relatively high brightness, and adequate arrangement for positioning the lamps becomes an important issue for the manufacturing of the display devices.

FIG. 1 is a top view of the structure for fastening the lamps to a backlight module of the prior art. As shown in FIG. 1, a lamp 91 is mounted over a rear plate 92. The lamp 91 is in a curved-line shape. Basically, the lamp includes two parts, i.e. the curved section 911, and the straight-line section 912. The lamp 91 is fastened on the rear plate by fixing the straight-line section 912 through the rubber pads 93. However, since the elements illustrated above will block the light from lamp 91, dark areas (the right-hand side of dotted lines in FIG. 1 generate in the display area of the display devices. Therefore, the quality of the whole backlight module deteriorates greatly.

FIG. 2 is a top view of another structure for fastening the lamps to a backlight module of another prior art. As shown in FIG. 2, a curved section 941 is included in the lamp 94. For eliminating the brightness problem illustrated above, the curved section 941 is arranged in the non-display area (i.e. the area not for displaying, shown in the left-hand side of the dotted lines in FIG. 2). However, this kind of arrangement will increase the occupied space or the volume of the backlight module. Hence, the backlight module as sown in FIG. 2 cannot meet the requirement (such as light-weight, small-size, and compactness) of the modem backlight module.

Therefore, it is desirable to provide an improved lamp positioning structure in order to mitigate and/or obviate the aforementioned problems.

SUMMARY OF THE INVENTION

The lamp positioning structure of the present invention is mounted on a display device. The display device includes a rear plate, a plurality of lamps, and a display panel. The lamp is curved-shaped and has a curved section and two straight-line sections. Part of the rear plate is upwardly folded to form a side plate. The side plate is corresponding to the curved sections of the lamps. Moreover, the display panel is mounted over the rear plate to cover the lamps mounted on the rear plate. In addition, the display panel has a display area for displaying images. Furthermore, as assembled, the curved section of the lamp is located in the display area.

The lamp positioning structure of the present invention includes a fastening element mounted on the side plate of rear plate. The fastening element has a top-side portion, a front-side portion, a rear-side portion, in which the three portions along with the rear plate, as the bottom portion, enclose a hollow portion for disposing the curved section of the lamp therein such that the front-side portion is located inside the curved section. The front-side portion protrudes transversely two elastic arms for abutting against the curved section, and the top-side portion has a through hole to expose the curved section of the lamp to the display area of the display panel.

Through the arrangement of the positioning structure of the present invention, the lamp is not only fixedly mounted by the fastening element but also fastened by the elastic arms. Of course, the breakage and the displacement of the lamp can be reduced or even prevented. Furthermore, since the light of the lamp will emit light from the through hole of the fastening element to the display area, the brightness of the curved section corresponding to the fastening element will become more uniform and without definite dark spots. Through the positioning structure of the present invention, the curved section of the lamp can be arranged in the display area of the display panel without increasing the size of the display device. Of course, the positioning of the lamp can be achieved, and the quality of whole display device can be improved.

The aforesaid positioning structure can further comprise an additional assembling plate extending upwardly from the rear-side portion to the side plate. The assembling plate can be mounted on the side plate thereby mounting the fastening element. The number of the fastening elements can be two or more. As the number of the fastening elements is two, the assembling plates combined to each other are used for mounting them to the side plate. The number of the fastening elements can be either increased or decreased. In fact, the number of the fastening elements depends on the number of the lamps in use.

In addition, the lamp of the present invention further comprises two electrode ends mounted on the end of two straight-line sections, the opposite sides of the curved section thereof. The rear plate of the present invention may be a plate including a bottom plate and a reflecting plate. Furthermore, the reflecting plate of the present invention is laid upon and overlapped the bottom plate. Moreover, the lamp is fastened over the reflecting plate by the fastening element.

Moreover, the display device can be a liquid crystal display television (LCD-TV).

Other objects, advantages, and novel features of the invention will become more apparent from the following detailed description when taken in conjunction with the accompanying drawings.

DETAILED DESCRIPTION OF THE PREFERRED EMBODIMENT

Figure 1:
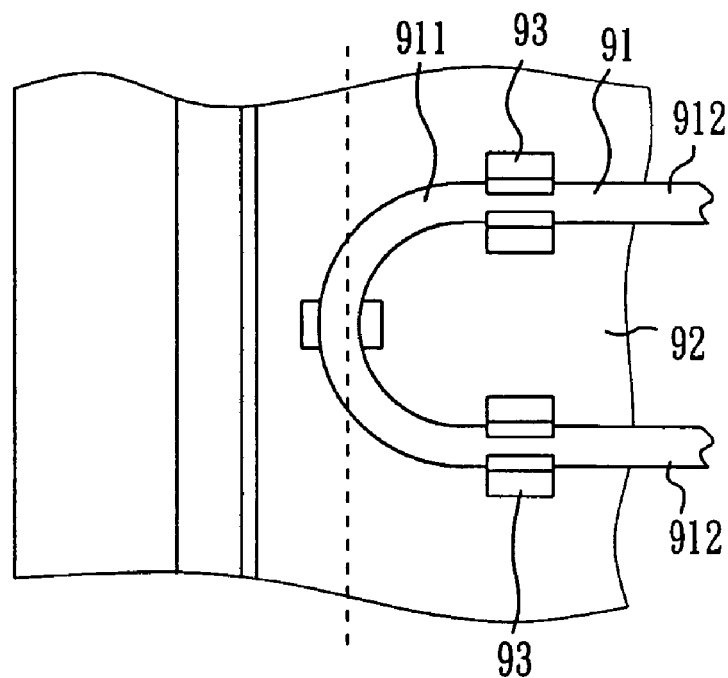
FIG. 1 is a fastening element for lamp of prior art.
Figure 2:
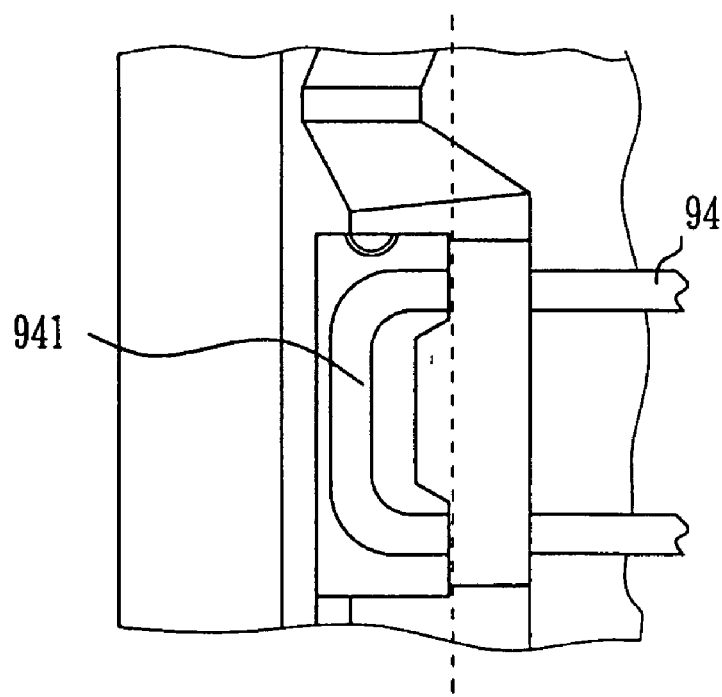
FIG. 2 is another fastening element for lamp of another prior art.
Figure 3:
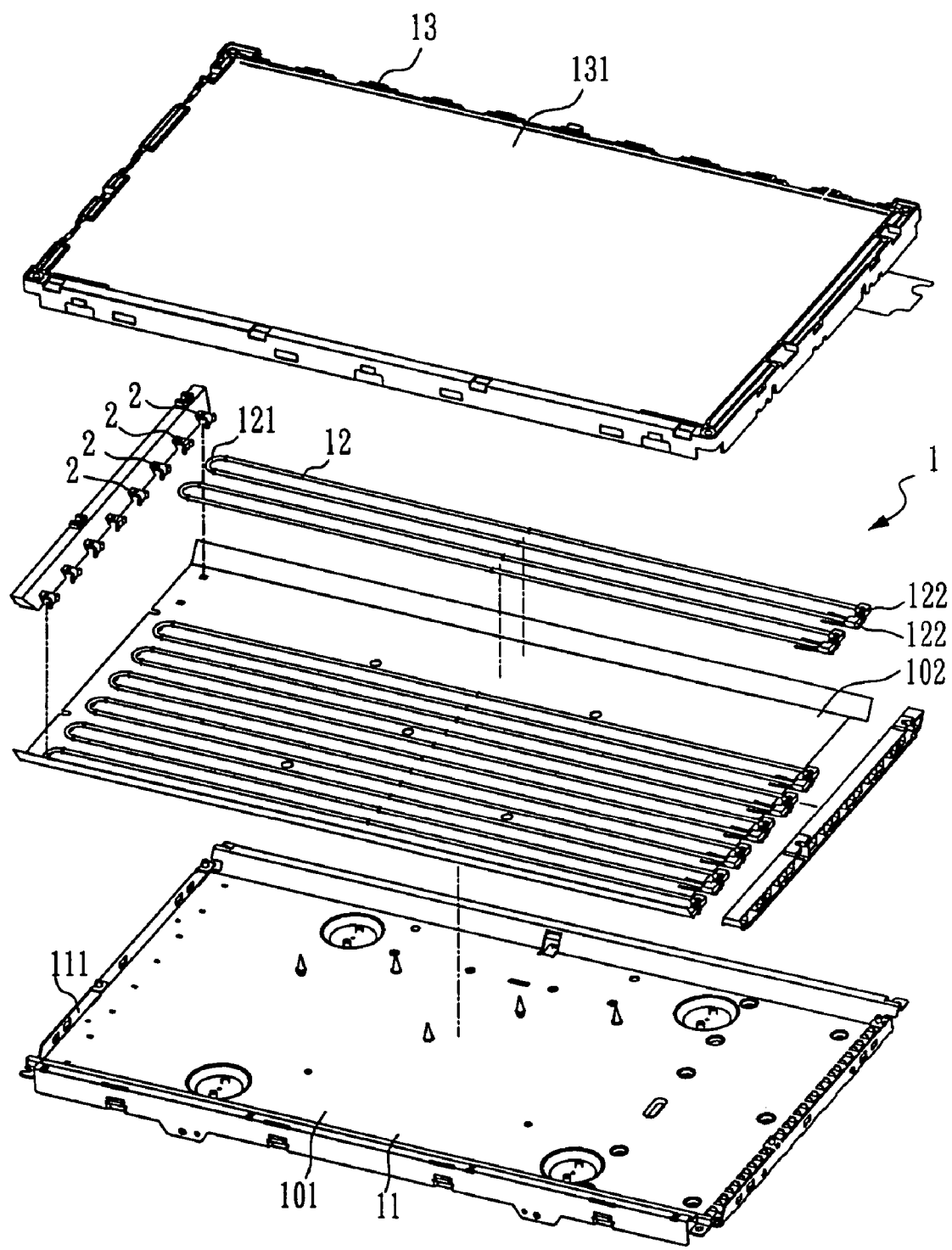
FIG. 3 is an exploded perspective view of the present invention.

FIG. 3 is an exploded perspective view of the display device using the lamp positioning structure of the present invention. As shown in FIG. 3, the display device 1, which is a liquid crystal display television (LCD-TV) in this embodiment, includes a rear plate 11, a plurality of lamps 12 and a display panel 13.

The rear plate 11 includes a bottom plate 101 and a reflecting plate 102. The reflecting plate 102 is arranged on the bottom plate 101. The plurality of lamps 12 is mounted over the reflecting plate 102.

Each of the lamps 12 is curved-line-shaped and has a curved section 121 and two straight-line sections. Each lamp includes two electrode ends 122 which are located at the end of two straight-line sections, the opposite side of the curved section 121. Therefore, power can be applied through the electrode ends 122 to turn on the lamps 12.

In addition, the rear plate 11 is folded upwardly to form a side plate 111. The side plate 111 is corresponding to the curved section 121 of each lamp 12. At the same time, the display panel 13 is assembled over rear plate 11 to cover the lamps 12. The display panel 13 has a display area 131 for displaying images. The curved section 121 of each lamp 12 is positioned in the display area 131 of the display panel 13.

Figure 4:
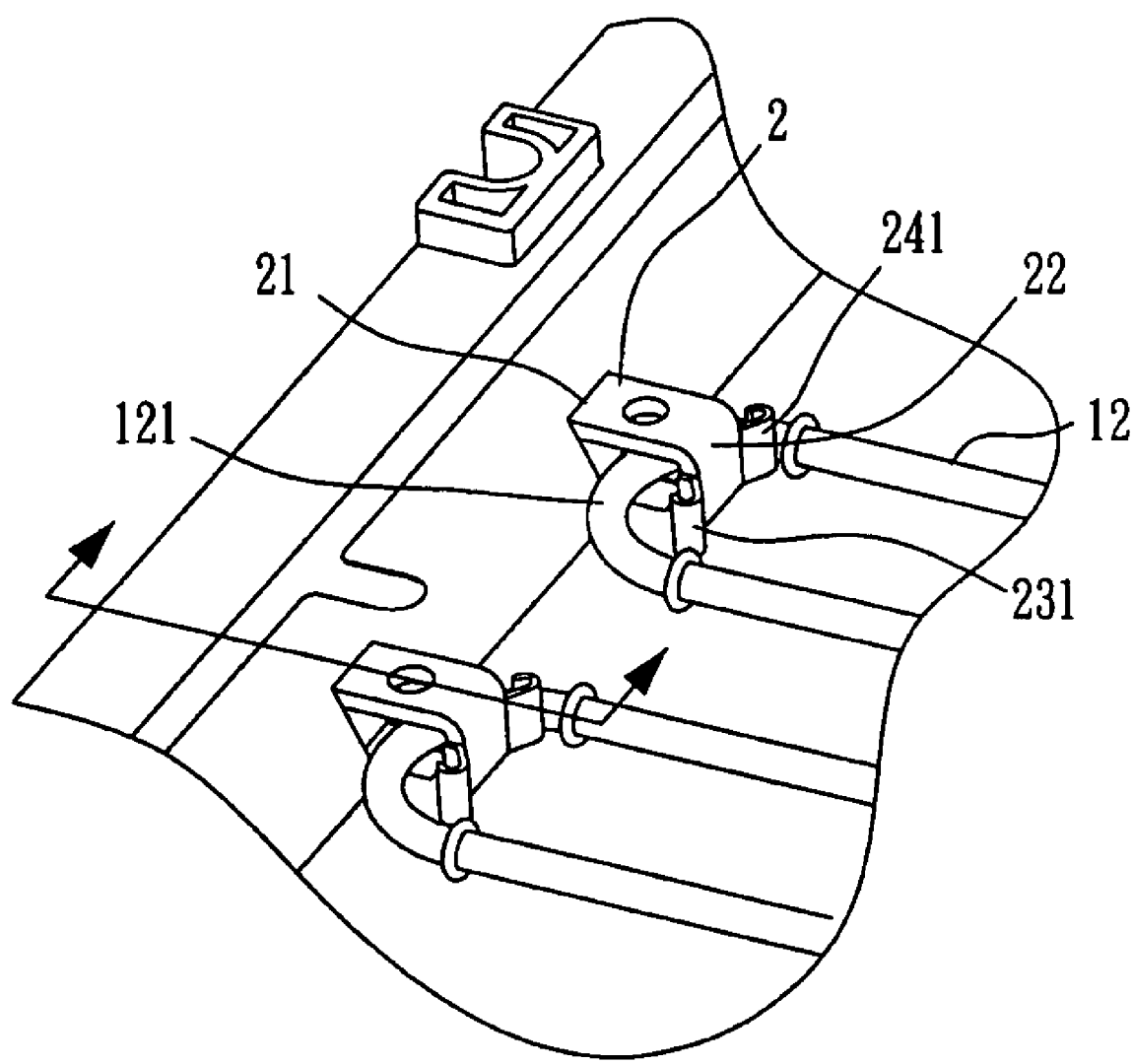
FIG. 4 is an enlarged schematic view of the lamp positioning structure of the present invention.
Figure 5:
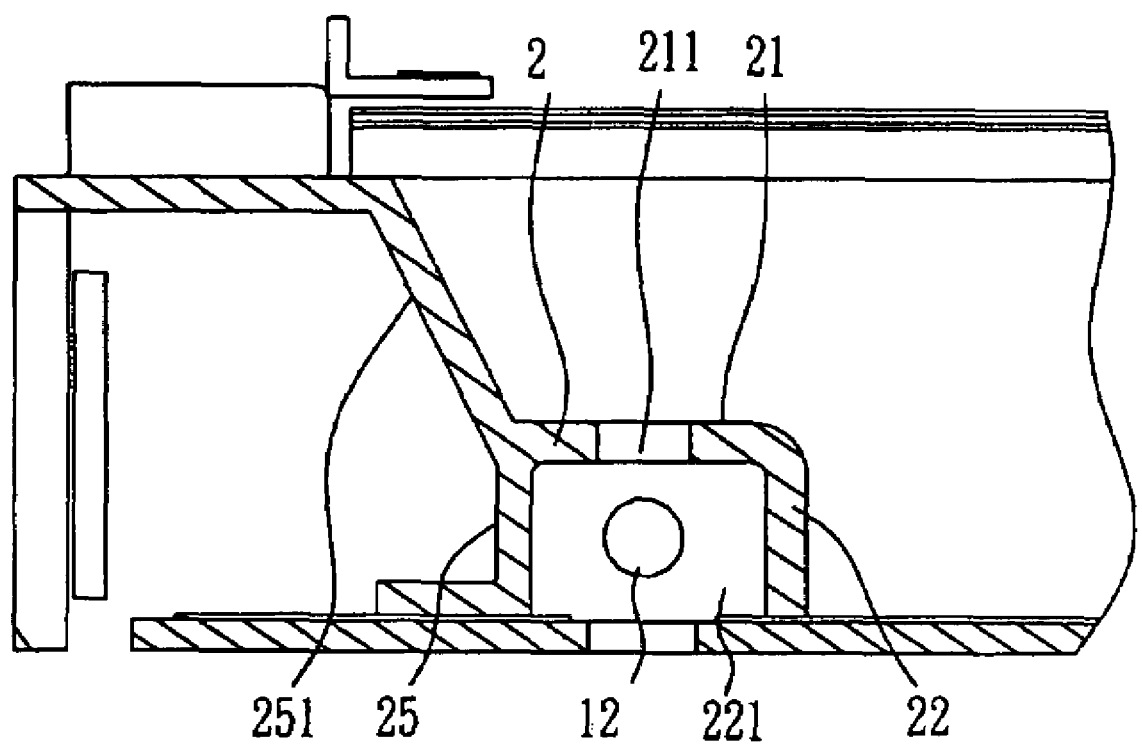
FIG. 5 is a cross-sectional view of the lamp positioning structure of the present invention.

For further illustration, please refer to FIG. 3, and FIG. 4. FIG. 4 is an enlarged schematic view of the positioning structure of the present invention. FIG. 5 is a cross-sectional view of the positioning structure of the present invention. As shown in these figures, each curved section 121 of the lamp 12 is fastened with a corresponding fastening element 2. Each fastening element 2 includes a rear-side portion 25. An assembling plate 251 extends upwardly from the rear-side portion 25 and is mounted on the rear-side portion 25. In the present embodiment, the assembling plates 251 are connected to each other, and are arranged abutting against the side plate 111 of the rear plate 11.

The fastening element 2 includes a top-side portion 21, a front-side portion 22, and a rear-side portion 25. The top-side portion 21 connects the front-side portion 22 and the rear-side portion 25. The three portions connected to each other along with the reflecting plate 102 of the rear plate 11 enclose a hollow portion 221. The hollow portion 221 is fitted with and combined with the curved section 121 of the lamp 12 to fasten the curved section 121 of the lamp 12 on the rear plate 11.

In addition, the front-side portion 22 is located inside the curved section 121 of the lamp 12 and protrudes transversely two elastic arms 231, 241. The elastic arms 231, 241 respectively abut against the curved section 121 of the lamp 12. Furthermore, a through hole 211 is formed in the topside portion 21 of the fastening element 2. The through hole 211 is used to expose the curved section 121 of lamp 12 to the display area.

When each curved section 121 of the lamps 12 abuts against the elastic arms 231, 241 of the both sides of fastening element 2, no displacement of the lamp 12 will be resulted. For the reliability test, the breaking problem can be prevented by the assistance of the elastic arms 231, 241 abutted against the lamp 12.

Moreover, the light from the lamps 12 can emit through the through hole 211 of fastening element 2 to the display area. Therefore, the distribution of the brightness close to the curved section 121 of the lamps 12 is relatively uniform. Furthermore, the curved section 121 can be arranged in the display area 131 of the display panel 13 without increasing the volume of whole display device 1. Furthermore, not only the lamps 12 are fastened in the right position, but also the quality of whole display device 1 is improved.

Although the present invention has been explained in relation to its preferred embodiments, it is to be understood that many other possible modifications and variations can be made without departing from the spirit and scope of the invention as hereinafter claimed.

What is claimed is:

1. A lamp positioning structure for a display device, which comprises a rear plate, at least a lamp having a curved section and two straight-line sections, and a display panel having a display area; wherein said rear plate has a side plate folded upwardly corresponding to said curved section, said display panel is mounted over said rear plate to cover said lamp, and said curved section is located in said display area, comprising:

a fastening element mounted on said side plate of said rear plate, comprising a top-side portion, a front-side portion, and a rear-side portion;

wherein said three portions along with the rear plate enclose a hollow portion for disposing said curved section of said lamp therein such that said front-side portion is located inside said curved section, said front-side portion protrudes transversely two elastic arms for abutting against said curved section, and said top-side portion has a through hole to expose said curved section of said lamp to the display area.

2. The lamp positioning structure of claim 1, wherein said fastening element further comprises an assembling plate extending upwardly from said rear-side portion for being mounted on said side plate.

3. The lamp positioning structure of claim 2, wherein said lamp positioning structure further comprises a plurality of said fastening elements, which are mounted to said side plate through said assembling plates combined to each other.

4. The lamp positioning structure of claim 1, wherein said lamp further comprises two electrode ends disposed at the end of said two straight-line sections.

5. The lamp positioning structure of claim 1, wherein said rear plate further comprises a bottom plate and a reflecting plate overlapped over bottom plate.

6. The lamp positioning structure of claim 5, wherein said lamp is fastened over said reflecting plate by said fastening element.

7. The lamp positioning structure of claim 1, wherein said display device is a liquid crystal display television.

* * * * *